United States Patent [19]

Bainard et al.

[11] 4,268,040
[45] May 19, 1981

[54] THRUST WASHER AND COMBINATION SEAL AND THRUST WASHER METHOD AND APPARATUS

[75] Inventors: Dean R. Bainard, Bethel Township, York County, S.C.; Martin E. Benjamin, Gastonia, N.C.

[73] Assignee: Garlock Inc., Longview, Tex.

[21] Appl. No.: 11,775

[22] Filed: Feb. 12, 1979

Related U.S. Application Data

[62] Division of Ser. No. 733,890, Oct. 19, 1976, Pat. No. 4,166,627.

[51] Int. Cl.³ .................. F16J 15/34; F16J 15/32; F16C 33/20
[52] U.S. Cl. .......................................... 277/1; 277/95; 277/152; 277/227; 277/212 C; 308/187.1; 308/163
[58] Field of Search .................. 277/37-43, 277/83, 85, 82, 88, 92, 95, 152, 153, 165, 177, 223, 227, 1, 212 C; 308/36.1, 187.1, 187.2, 135, 163

[56] References Cited

U.S. PATENT DOCUMENTS

| 2,213,116 | 8/1940 | Bernstein | 277/223 X |
| 2,804,324 | 8/1957 | Stallings | 277/223 X |
| 2,804,325 | 8/1957 | Riesing | 277/223 X |
| 3,210,108 | 10/1965 | Herbenar | 308/36.1 X |
| 3,220,756 | 11/1965 | Templeton | 308/36.1 X |
| 3,493,645 | 2/1970 | Sanderson et al. | 264/161 |
| 3,519,316 | 7/1970 | Gothberg | 308/187.2 X |
| 3,554,560 | 1/1971 | Miyake | 277/42 X |
| 3,594,050 | 7/1971 | Gothberg | 308/187.2 |
| 3,951,482 | 4/1976 | Blaydon | 308/187.1 |
| 4,166,627 | 9/1979 | Bainard et al. | 277/212 C X |

FOREIGN PATENT DOCUMENTS

| 1481276 | 4/1967 | France | 277/82 |
| 7501393 | 8/1975 | Netherlands | 308/36.1 |
| 602746 | 6/1948 | United Kingdom | 277/37 |
| 1191148 | 5/1970 | United Kingdom | 308/187.2 |

*Primary Examiner*—Robert S. Ward, Jr.
*Attorney, Agent, or Firm*—Schovee & Boston

[57] ABSTRACT

A thrust washer having a backing layer of resilient material such as rubber or other elastomers and having, for example, a polytetrafluoroethylene bearing surface, which can include one or more integral sealing lips formed from the polytetrafluoroethylene bearing material. Another aspect of this invention is a unitary article including said resiliently-backed thrust washer in combination with a seal. This unitary article can be purchased and installed as a unit taking the place of four separate prior art elements that had to be purchased and installed separately.

25 Claims, 3 Drawing Figures 4,268,040

THRUST WASHER AND COMBINATION SEAL AND THRUST WASHER METHOD AND APPARATUS

This is a division of application Ser. No. 733,890, filed Oct. 19, 1976 and now U.S. Pat. No. 4,166,627.

BACKGROUND OF THE INVENTION

1. Field of the Invention

This invention relates to thrust washers and to seals and in particular to an improved thrust washer and also to a unitary combination of said improved thrust washer and a seal.

2. Description of the Prior Art

In many applications, seals are used in proximity to thrust washers which can be, for example, a ring made of treated nylon material. These parts are purchased separately and installed separately. In addition, some applications require the four separate parts of: (1) a metal, seal-retaining ring, (2) a primary seal, (3) a thrust washer, and (4) a secondary seal, which separate parts must be purchased separately and installed separately.

It is an object of the present invention to overcome such problems in the prior art and to provide a unitary seal and thrust washer.

In prior art applications requiring thrust washers and which are not under load at all times, the prior art thrust washers have a tendency to "pound out" (plastics have a tendency to "plastic flow" which means, for example, that if a plastic thrust washer is hit enough times with no give, it has a tendency to deform and change its shape or extrude slightly).

It is another object of the present invention to overcome such problems in the prior art by providing a resiliently-backed thrust washer and to also prevent shock build-up between two axially movable members. It is another object of the present invention to provide a rubber-backed thrust washer having an integral sealing lip.

SUMMARY OF THE INVENTION

A unitary seal and thrust washer which, in the preferred embodiment, includes a resilient, one-piece, molded elastomeric body forming the major part of both the seal and the thrust washer. The seal includes a mounting portion, preferably with an annular metal shell bonded to the elastomeric body, and a sealing portion with, in a preferred embodiment, a pair of sealing lips. The integral thrust washer is ring shaped and includes, in a preferred embodiment, a polytetrafluoroethylene bearing surface. In a preferred embodiment, the thrust washer includes an additional polytetrafluoroethylene sealing lip, formed as an extension of the material of the polytetrafluoroethylene bearing surface.

Another aspect of this invention is the rubber-backed thrust washer per se, with an integral sealing lip, if desired, formed, for example, as an extension of the polytetrafluoroethylene liner that forms the bearing surface.

BRIEF DESCRIPTION OF THE DRAWING

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
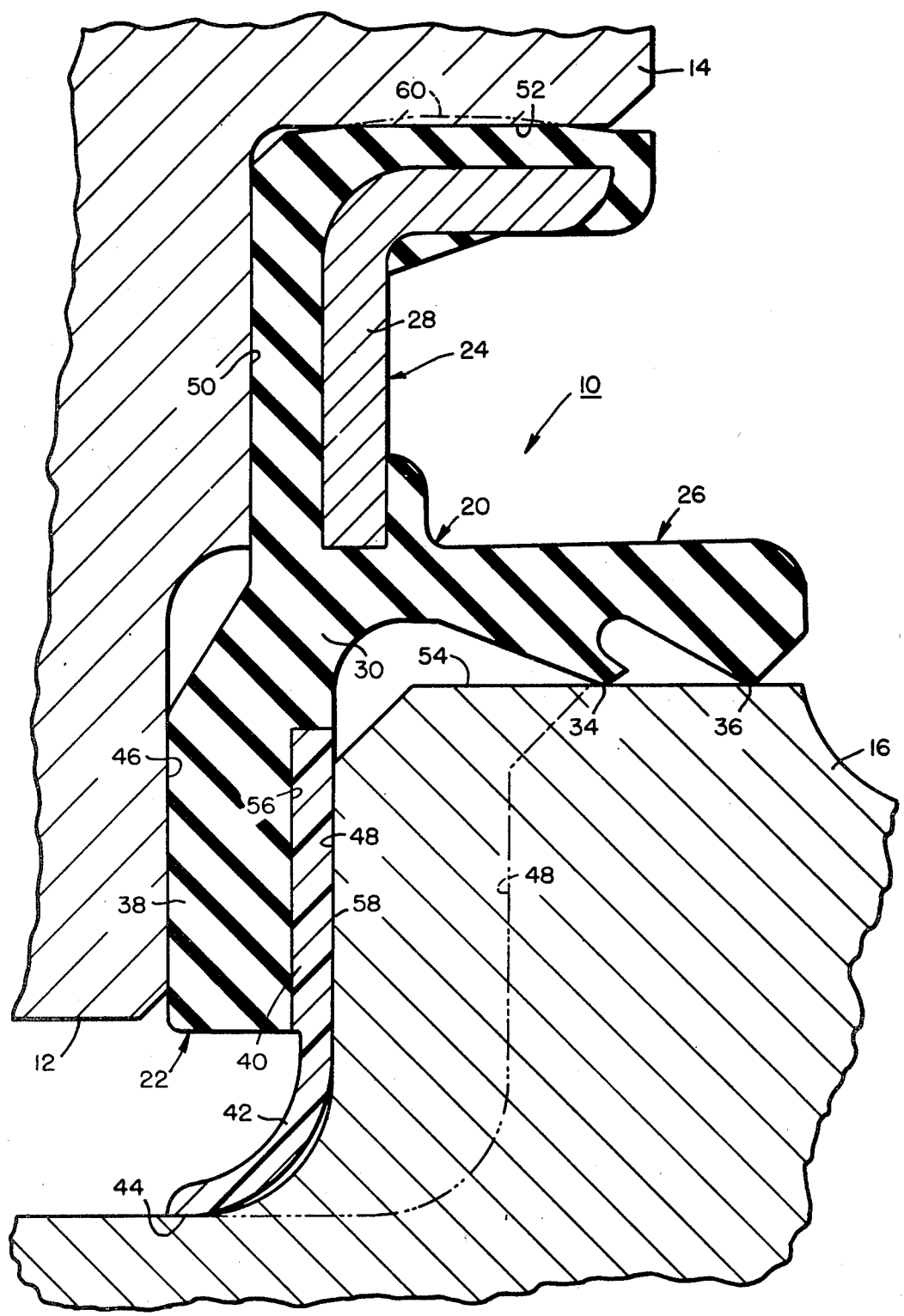
FIG. 1 is a partial cross-sectional view through a preferred embodiment of a unitary seal and thrust washer according to the present invention.

With reference now to the drawing, FIG. 1 shows a preferred embodiment of a unitary seal and thrust washer 10 according to the present invention as used in the preferred application in a bore 12 between a housing 14 (such as a dead spindle on a front wheel drive vehicle) and a shaft 16 (such as an axle or drive shaft) which is both rotatably and axially movable (to the position shown by phantom line 48) relative to the housing 14 (alternatively, of course, the shaft 16 can be one that is stationary and the housing can be movable, or there can be a combination of such movement).

The unitary seal and thrust washer 10 comprises a seal 20 and a thrust washer 22 integrally connected to the seal 20 with both the seal 20 and thrust washer 22 being made or formed from a resilient one-piece, molded, body 30 of elastomeric material. While any known type of seal can be used and made unitary with the thrust washer 22, a preferred one is shown comprising a mounting portion 24 and a sealing portion 26. The mounting portion 24 includes an annular metal reinforcing shell 28 bonded to the elastomeric body 30. The sealing portion 26 includes a pair of sealing lips 34 and 36.

The thrust washer 22 comprises a ring 38 of resilient, elastomeric material having a bearing surface 58 of reduced coefficient of friction on one radial surface thereof. In the preferred embodiment, the surface of reduced coefficient of friction is provided by an annular liner 40 of polytetrafluoroethylene bonded to said body of elastomeric material (as is known in the art, for example, by etching the polytetrafluoroethylene layer and providing a layer of adhesive between it and the elastomer and applying heat and pressure). The liner 40 can include an extension 42 forming an additional sealing lip 44 in addition to the sealing portion 26. The thrust washer 22 is located between a radial surface 46 of the housing 14 and a radial surface 48 of the shaft 16. These radial surfaces 46 and 48 can move axially relative to each other and thus the thrust washer 22 is not under load at all times (in this particular application). The resilient rubber backing (the layer of elastomeric material 38) prevents the prior art "pounding out", and instead "gives" a little bit, preventing this "pounding out" and also cushioning the blow and preventing the shock build up. While the backing layer 38 is preferably resilient, this is not essential to all aspects of this invention.

The mounting portion 24 of the seal 20 is installed with an interference fit (see, for example, the O.D. 60 of the seal 20 as molded) in the counterbore 52 and is moved axially up against a radial wall 50 of the housing 14.

In another aspect of this invention as described below in more detail with respect to FIGS. 2 and 3, the thrust washer 22 can be used alone, separate from the seal 20. The thrust washer has particular application (although it is not limited to use in such application) as a light duty thrust bearing where the thrust washer is not under load at all times and is thus subject to pounding between two axially movable members. The additional sealing lip 44 can be used, if desired, similarly as when the thrust washer 22 is unitized with a seal 20.

The additional sealing lip 44 can be formed (bent) to the shape shown in FIG. 1 if desired. Other materials can be used for the bearing surface 58, such as nylon where friction is a lesser problem, for better abrasion resistance. The sealing portion 26 shown in FIG. 1 is designed for dirt exclusion but the present invention is not limited to such type of seal. Either or both of the sealing lips 34 and 36 may be spring loaded, as is well-known in the art.

Figure 2:
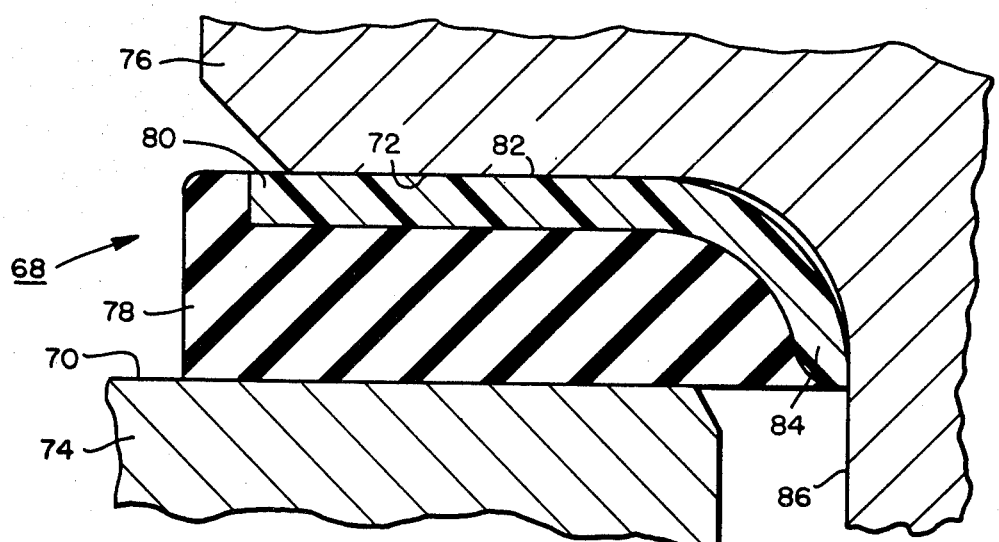
FIGS. 2 and 3 are partial cross-sectional views through two different embodiments of thrust washers according to the present invention.

FIG. 2 shows a thrust washer 68 according to another embodiment of the present invention installed between adjacent spaced-apart, radial surfaces 70 and 72 of a housing 74 and a shaft 76, respectively. The thrust washer 68 comprises a resilient backing layer 78 and a polytetrafluoroethylene liner 80 bonded to the backing layer and providing a bearing surface 82. The thrust washer 68 includes a sealing lip 84 in contact with a cylindrical surface 86 of the shaft 76. The entire lip 84 can be bonded to the resilient backing layer 78, for support, or it can be spaced therefrom as shown in FIGS. 1 and 3.

Figure 3:
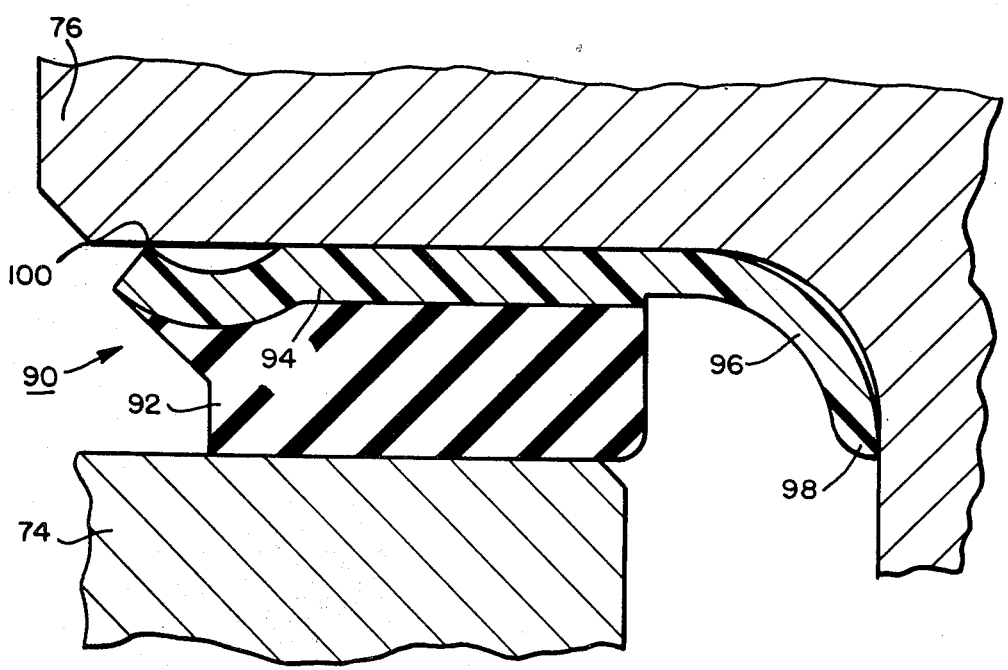

FIG. 3 shows another thrust washer 90 of the present invention, installed between the housing 74 and shaft 76. The thrust washer 90 comprises a resilient backing layer 92 and a bearing liner 94, preferably of polytetrafluoroethylene. The liner 94 includes an extension 96 forming an inner sealing lip 98 and also an outer sealing lip 100. To urge the lip 100 against the surface 72 it is curved away from the surface 72 and then back toward the surface 72 and the lip 100 is backed up, and thus biased toward the surface 72, by the backing layer 92.

The invention has been described in detail with particular reference to the preferred embodiments thereof, but it will be understood that variations and modifications can be effected within the spirit and scope of the invention as described hereinabove and as defined in the appended claims.

What is claimed is:

1. An article comprising a thrust washer including a flat, radially extending, ring-shaped member having a pair of radial contact surfaces, said member comprising a backing layer of resilient elastomeric material forming one of said radial contact surfaces, bonded to a bearing layer made of a low coefficient of friction material forming the other of said radial contact surfaces, said bearing layer extending substantially the entire radial dimension of said backing layer and including a sealing lip at both its I.D. and O.D. edge.

2. An article comprising a thrust washer including a flat, radially extending, ring-shaped member having a pair of radial contact surfaces, said member comprising a backing layer of resilient elastomeric material forming one of said radial contact surfaces, bonded to a bearing layer made of a low coefficient of friction material forming the other of said radial contact surfaces, said bearing layer extending substantially the entire radial dimension of said backing layer and including a sealing lip at at least one of its I.D. and O.D. edges, and wherein said backing layer is bonded to said at least one sealing lip for urging said at least one bonded lip toward a surface to be sealed thereby.

3. A method comprising the steps of:
(a) positioning, between first and second adjacent, axially spaced-apart, annular, radial surfaces of first and second relatively rotatable and relatively axially movable members, respectively, a thrust washer having a resilient backing layer bonded to a bearing layer of low coefficient of friction material, said backing layer forming a first radial surface and said bearing layer forming a second radial surface of said thrust washer;
(b) positioning said first radial surface of said thrust washer in contact with said first radial surface of said first member;
(c) positioning said second radial surface of said thrust washer in contact with said second radial surface of said second member; and
(d) mounting said thrust washer with respect to said members such that said backing layer remains stationary with respect to said first member and said second member moves both rotationally and axially relative to said bearing layer, whereby said thrust washer cushions the blow and prevents any pounding out caused by said relative axial movement of said members.

4. The method according to claim 3 wherein said bearing layer is made of polytetrafluoroethylene and includes a sealing lip and including the step of sealing the space between said members by positioning said sealing lip in contact with said second member.

5. The method according to claim 4 wherein said second member includes an axial surface adjacent said second radial surface and wherein said sealing step includes contacting said sealing lip with said axial surface.

6. The method according to claim 5 wherein said bearing layer includes a sealing lip at each radial end thereof, and including the step of sealing the space between said members by positioning said sealing lips in contact with said second member with one of said sealing lips in contact with said axial surface and one of said sealing lips in contact with said second radial surface of said second member.

7. The method according to claim 4 wherein said bearing layer includes a sealing lip at each radial end thereof and including the step of sealing the space between said members by positioning said sealing lips in contact with said second member.

8. The method according to claim 4 including spacing said sealing lip away from and out of contact with said backing layer.

9. The method according to claim 8 wherein said second member includes an axial surface adjacent said second radial surface and wherein said sealing step includes contacting said sealing lip with said axial surface and including curving said sealing lip in the axial direction toward said first member.

10. The method according to claim 9 wherein said thrust washer is a flat, radially extending, ring-shaped thrust washer and wherein said curving sealing lip is adjacent the radially inner edge of said thrust washer.

11. The method according to claim 4 wherein said bearing layer includes a sealing lip at each radial end thereof and including the step of sealing the space between said members by positioning one of said sealing lips in contact with said second member, and wherein said second member includes an axial surface adjacent said second radial surface and wherein said sealing step includes contacting one of said sealing lips with said axial surface.

12. The method according to claim 4 wherein said bearing layer includes a sealing lip at each radial end thereof and including the step of sealing and space between said members by positioning one of said sealing lips in contact with said second member and including spacing one of said sealing lips away from and out of contact with said backing layer.

13. The method according to claim 12 wherein said thrust washer is a flat, radially extending, ring-shaped thrust washer and wherein said curving sealing lip is adjacent the radially inner edge of said thrust washer.

14. The method according to claim 13 wherein said second member includes an axial surface adjacent said second radial surface and wherein said sealing step includes contacting said sealing lip with said axial surface and including curving said sealing lip in the axial direction toward said first member.

15. The method according to claim 3 including providing said backing layer with a greater thickness than that of said bearing layer.

16. The method according to claim 3 including mounting said thrust washer stationarily with respect to said first member, whereby said second member rotates relative to said bearing layer.

17. The method according to claim 3 including providing said thrust washer as a flat, radially extending, ring-shaped thrust washer, and wherein said radial surfaces of said members are perpendicular to the axis of relative rotation thereof.

18. The method according to claim 3 wherein said first member is a housing having a bore therethrough and wherein said second member is a shaft extending through said bore, and wherein said thrust washer is a generally flat, radially extending, ring-shaped thrust washer.

19. An article comprising a thrust washer including a flat, radially extending, ring-shaped member having a pair of radial contact surfaces, said member comprising a backing layer of resilient elastomeric material forming one of said radial contact surfaces, bonded to a bearing layer made of a low coefficient of friction material forming the other of said radial contact surfaces, said bearing layer extending substantially the entire radial dimension of said backing layer and including a sealing lip at at least one of its I.D. and its O.D. edge, said sealing lip being spaced away from and out of contact with said backing layer.

20. The article according to claim 19 wherein said sealing lip curves in an axial direction at its distal end so as to be adapted to seal against an axial surface.

21. The article according to claim 19 wherein said bearing layer is made of polytetrafluoroethylene.

22. The article according to claim 1 wherein said sealing lip at the I.D. edge of said bearing layer is spaced away from and out of contact with said backing layer.

23. The article according to claim 22 wherein said sealing lip at the O.D. edge of said bearing layer is bonded to said backing layer.

24. The article according to claim 1 wherein said bearing layer is made of polytetraflurorethylene.

25. The article according to claim 2 wherein said bearing layer is made of polytetrafluoroethylene.

* * * * *

UNITED STATES PATENT OFFICE
CERTIFICATE OF CORRECTION

PATENT NO. : 4,268,040
DATED : May 19, 1981
INVENTOR(S) : Dean R. Bainard and Martin E. Benjamin It is certified that error appears in the above-identified patent and that said Letters Patent are hereby corrected as shown below:

In claim 12, line 3, please delete "and", second occurrence, and substitute therefor "the".

Signed and Sealed this

Twenty-eighth Day of July 1981

[SEAL]

Attest:

GERALD J. MOSSINGHOFF

Attesting Officer     Commissioner of Patents and Trademarks